United States Patent

[11] 3,575,047

| [72] | Inventors | Lee Hunter |
| | | St. Louis Co.; |
| | | David A. Senften, Florissant, Mo. |
| [21] | Appl. No. | 811,161 |
| [22] | Filed | Mar. 27, 1969 |
| [45] | Patented | Apr. 13, 1971 |
| [73] | Assignee | Hunter Engineering Company |
| | | Bridgeton, Mo. |

[54] RADIAL TIRE FORCE DETERMINING APPARATUS
10 Claims, 10 Drawing Figs.

[52] U.S. Cl. ............................................. 73/146
[51] Int. Cl. .......................................... G01m 17/02
[50] Field of Search .......................... 73/146, 11; 33/203, 303.11

[56] References Cited
UNITED STATES PATENTS
2,914,940  12/1959  Elliott et al. .................. 73/146
3,060,733  10/1962  Herzegh ....................... 73/146

*Primary Examiner*—Donald O. Woodiel
*Attorney*—Gravely, Lieder and Woodruff

ABSTRACT: A tire of a vehicle having a finder is supported on a pair of tire cradling rollers driven by a motor connected by a belt to one of the rollers. Two sensor units are connected to a vehicle motion follower responsive to the movement of the finder due to tire strength variations around the circumference of the tire to effect indications of vehicle movement and maximum range of vehicle movement.

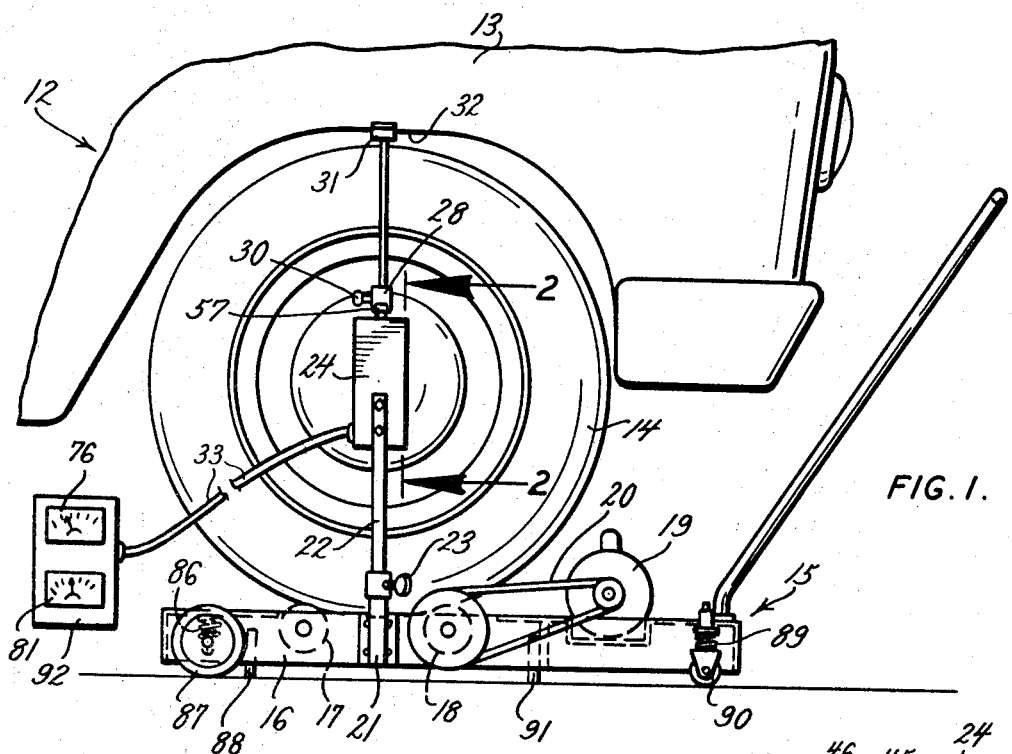
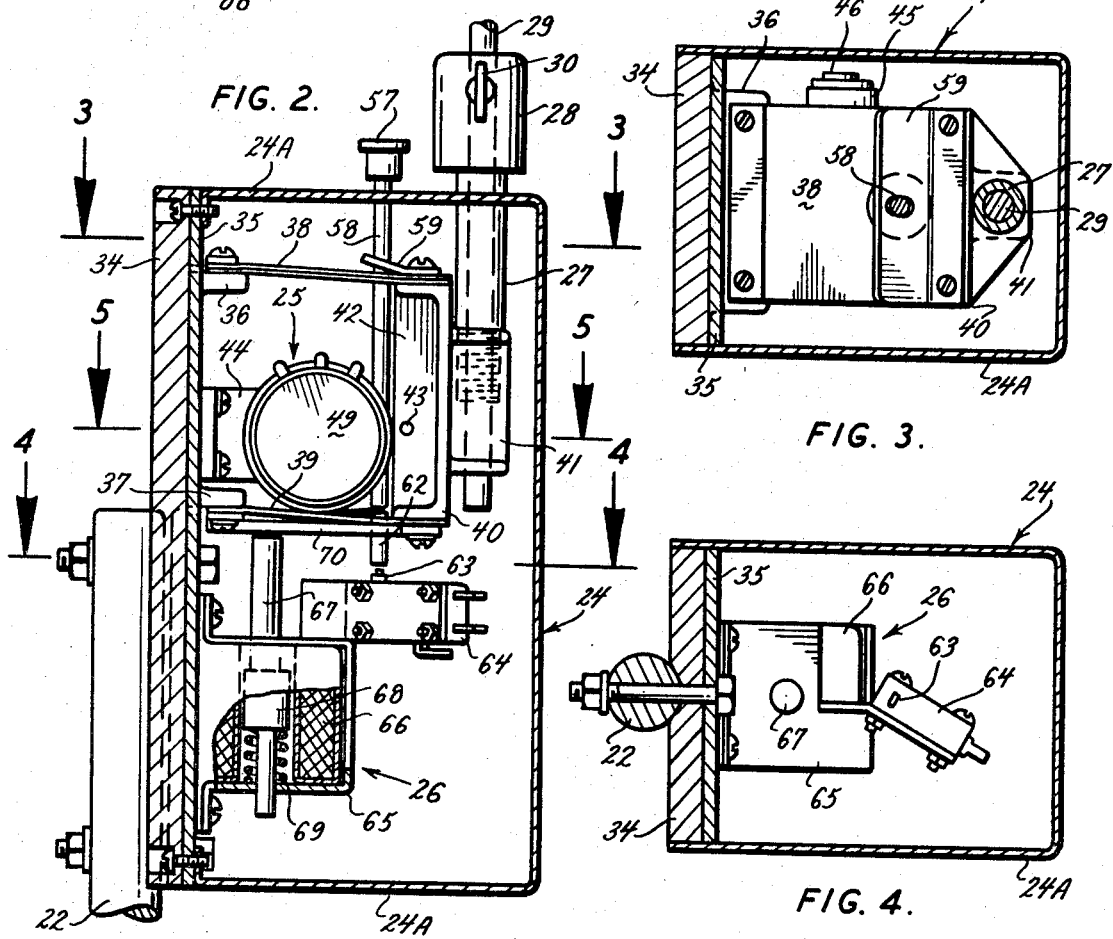

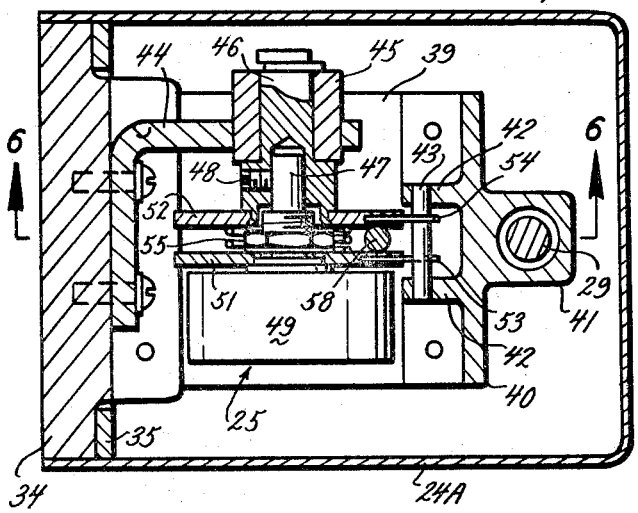
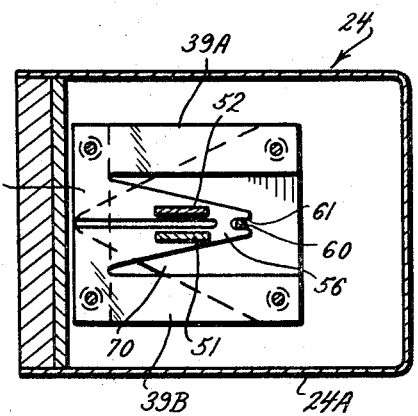
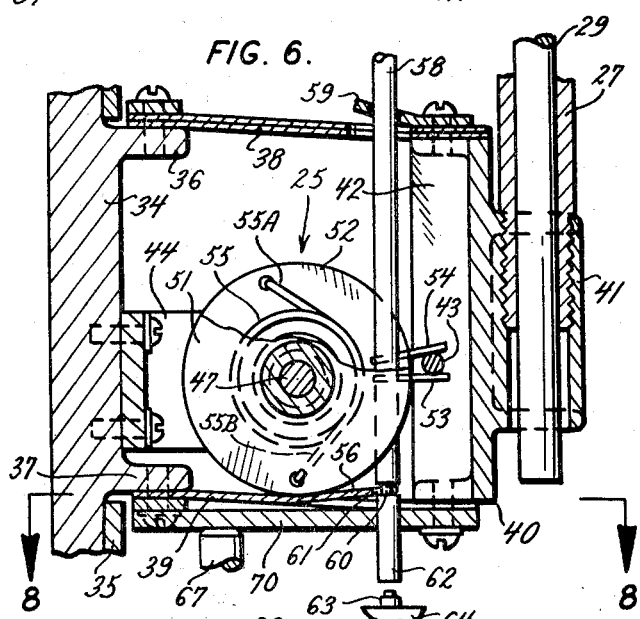
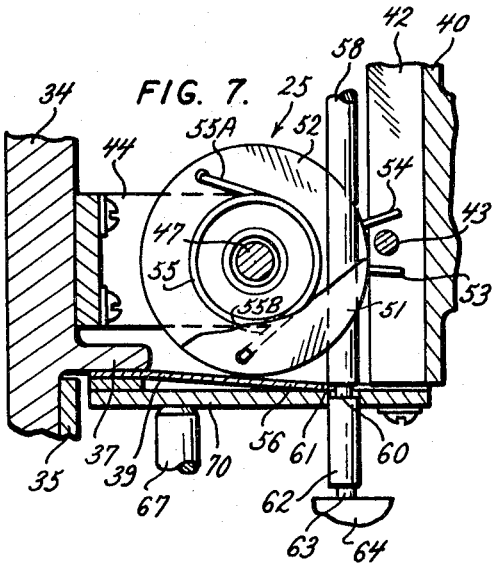
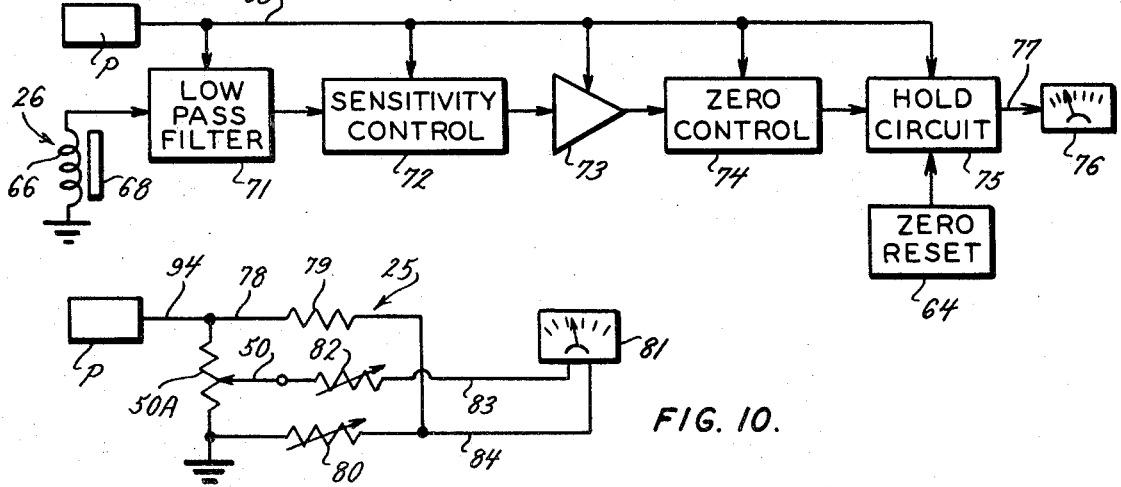

RADIAL TIRE FORCE DETERMINING APPARATUS

This invention pertains to apparatus for determining the presence of vehicle vibration and road thumping disturbances attributable to characteristics inherent in tire construction which at normal road speeds may be attributed to wheel suspension mechanisms, body or frame vibrations, and other portions of a vehicle that might be adversely affected by tire reactions.

It is increasingly apparent that the vehicle wheel suspension systems of vehicles are sufficiently soft or responsive to wheel and tire rotation effects to transmit undesirable vibrations and other disturbances to the steering system so that drivers are conscious of the disturbances by steering wheel reactions and general vehicle responses. Repeated examinations of the suspension systems of vehicles experiencing the noted disturbances by conventional testing apparatus will not locate the problem. It is, of course, understood that vehicles have critical vibration responses at certain road speeds so that until now nobody has suspected the problem to be associated with tire construction.

The present determining means is intended to expand and refine the ability of vehicle service people to accurately locate the vibration problem by providing means for examining the vehicle tires while rotating with the load of the vehicle imposed thereon. Vibration problems due to inequalities in the construction of tires can be determined by the present means and as a result faulty tires can be located and removed from the steerable wheels with a consequent improvement in the handling characteristics of the vehicle. Lack of uniformity in tire construction may arise by reason of faulty laying up of the carcass plies, excessive ply overlap, variations in thread thickness, lack of uniform density of the carcass and tread materials, and other inequalities. All of these characteristics have an effect upon the strength of a tire when under load conditions so that during rotation a tire sidewall may have more yield or give in some areas more than in others. As a consequence the vehicle when running is caused to rise and fall or have an undulating motion which is superimposed on the normal responses to road surface conditions. It is this undulating motion that causes the disturbances which are transmitted to the driver's feel at the steering wheel, and such motion is accentuated as vehicle speeds are increased.

An important object of this invention is to provide apparatus which will accurately determine the presence of inequalities in the strength of vehicle tires and indicate the magnitude of weak spots by responding to the forces applied radially on the tires by the weight of the vehicle.

It is another object of this invention to provide means for testing vehicle tires under normal vehicle loads to locate tires which may be causing disturbances and problems of the character indicated.

It is also an object of this invention to provide electrically responsive means of simple construction and reliability for the purpose of locating faulty tires and generally thereby improving the operation and safety of vehicles.

A preferred embodiment of the radial tire force determining apparatus includes a wheel spinning unit which supports the vehicle wheel by its tread and rotates the same at a low speed so that vehicle suspension mechanisms and shock absorber responses are not excited to the state where they contribute to the vibrations that come directly from the tires. The spinning unit is provided with electrical sensors responsive to vehicle body motion and a pickoff unit for translating the vehicle motion into an electrical indication for visually displaying the signals produced by tire force effect on the vehicle body.

The preferred embodiment is hereinafter shown in the drawings and described in sufficient detail to enable those having skill in this art to fully understand the same.

In the accompanying drawings:

FIG. 1 is a fragmentary side elevational view of a vehicle right front wheel and fender showing the components of the preferred apparatus of this invention;

FIG. 2 is a greatly enlarged sectional elevational view of the vehicle motion sensor unit, the view being taken at line 2–2 of FIG. 1;

FIG. 3 is a fragmentary sectional view taken at line 3–3 of FIG. 2;

FIG. 4 is another fragmentary sectional view at line 4–4 in FIG. 2;

FIG. 5 is still another fragmentary sectional view at line 5–5 in FIG. 2;

FIG. 6 is a sectional elevational view taken at line 6–6 in FIG. 5;

FIG. 7 is a view similar to FIG. 6 but showing a different condition of operation;

FIG. 8 is a fragmentary sectional view at line 8–8 in FIG. 6;

FIG. 9 is a diagrammatic electrical circuit showing the several components therein; and FIG. 10 is a further diagrammatic electrical circuit for a sensor in the apparatus of FIG. 2.

The embodiment to be described herein is a variation of the apparatus shown and claimed in a companion application for patent filed by Lee Hunter entitled "Radial Tire Force Indicator Apparatus," filed on Feb. 20, 1969, and bearing Ser. No. 800,869.

In FIG. 1 there is seen a portion of a vehicle 12 which includes the right front fender 13 and tire 14. The tire is supported on a rotation unit 15 which includes a suitable frame 16 having a pair of tire cradling rollers 17 and 18 and drive motor 19 connected by belt means 20 to the roller 18. The motor 19 rotates the tire 14 at low speed, of the order of 5 miles per hour, so that the components of the wheel suspension system and the vehicle chassis or frame are not excited to an undesired state of vibratory response. Also, the low speed does not excite the usual shock absorber resistance to wheel displacement. The tire 14 supports its normal portion of the vehicle weight, and the opposite tire (not shown) is elevated an amount to place the vehicle in a level position from side to side.

The unit 15 is provided with a socket 21 into which is telescoped the bottom end of a vertical post 22. The post may be moved as required in a vertical direction and clamped by thumb screw 23.

The upper end of post 22 supports a housing 24 (FIGS. 1 and 2) containing electrical sensor units 25 and 26 which will be described presently. The sensor unit 25 supports the lower end of a sleeve 27, the upper end being extended outwardly of the housing 24 to receive a cap 28. An adjustable feeler rod 29 telescopes into the sleeve 27 and may be fixed in adjusted position by thumb screw 30 mounted in cap 28. The upper end of the feeler rod 29 is provided with a pad 31 adapted to abut with the lip 32 of the vehicle finder 13. Electrical signals from the sensors 25 and 26 mounted in housing 24 are transmitted through a suitable wire bundle 33 which will be described in connection with FIGS. 9 and 10.

It has been pointed out above that variations in the strength of a vehicle tire about its circumference cause the tire sidewall to flex under the vehicle weight. Some areas of a tire may be weaker than others which results in the presence of soft and hard or stiff spots. These variations cause vertical movement which shows up when the tire is rotated and the vehicle fender is caused to rise or fall in undulating motion. The undulating motion is picked up by the feeler rod 29 which transmits the motion to the sleeve 27 and into housing 24.

Referring now to FIGS. 2 and 3, and other designated views, it can be seen that the housing 24 includes a base plate 34 supporting the cover 24A. An inner plate 35 is provided with slots through which extend ears 36 and 37 arranged in vertically spaced relation. A flexible yoke is connected to these ears by an upper leg plate 38 and a lower leg plate 39 having spaced arms 39A and 39B (FIGS. 5 and 8). The plates 38 and 39 are flexible and retain a bracket 40 in an initial neutral position. The bracket 40 is provided with a threaded bore 41 into which is threadedly mounted the lower end of the sleeve 27 (FIG. 6) so that vertical motion of the sleeve 27 due to motion of the vehicle fender 13 will cause the yoke arms 38 and 39 to flex. Also, the bracket 40 is provided on its inner side (FIGS. 5 and 6) with spaced ribs 42 to carry a fixed actuator pin 43 to be described presently as to its function. The pin 43 follows the motion of the vehicle fender 13.

Base plate 34 (FIGS. 2, 5 and 6 and 7) supports an angle bracket 44 for a bearing socket 45. A rotary shaft extension 46 is mounted in the bearing socket to receive a shaft 47 secured by setscrew 48. The shaft 47 extends into a housing 49 to support the brush arm 50 (FIG. 10) of a potentiometer assembly fixed in the housing 49. The housing 49 rotates relative to the shaft 47 and is driven by a disc 51. Shaft 47 is connected to a second disc 52 which rotates the shaft relative to the housing 49. The disc 51 is provided with a drive finger 54 which is radially directed to pass under the pin 43, while disc 52 has a drive finger 54 radially directed to pass on top of the pin 43. A suitable torsion or clock spring 55 has an arm 55A engaged in the disc 52 and its opposite arm 55B engaged in the disc 51 (FIG. 6). The spring 55 is intended to rotate the respective disc 51 and 52 in normal directions such that the drive fingers engage on the bottom and top of the pin 43.

It can now be appreciated that vertical displacement of the pin 43 due to vehicle fender movement will cause the discs 51 and 52 to be rotated for purposes of moving the housing 49 and shaft 47 in opposite directions. The discs 51 and 52, however, would always follow the pin 43 because of the action of the spring 55. In order to arrest the discs 51 and 52 in the moved or displaced positions, the lower plate 39 (FIGS. 6, 7 and 8) is formed with a resilient brake finger 56 which extends outwardly from the ear 37 on the base 34. The brake finger 56 normally engages both discs 51 and 52 (FIGS. 6, 7 and 8) to hold these discs in their respective positions of rotary displacement by the pin 43.

The discs 51 and 52 are released by a release button 57 (FIGS. 2 and 6) at the exterior of housing 24. The button 57 operates a shaft 58 slidable in guide 59, the shaft extending downwardly to a notch 60 which is engaged in a slot 61 in the extremity of the brake finger 56. The lower end 62 of the release shaft 58 projects into alignment with the button 63 on a reset switch 64.

The lower end of the inner plate 35, below the potentiometer actuating yoke arm 39, supports a bracket 65 on which the reset switch 64 is mounted. Bracket 65 carries the coil 66 of a solenoid-type sensor 26. An armature shaft 67 carries a magnet 68 disposed in the coil 66 and suspended by a coil spring 69. Shaft 67 extends above the sensor 26 where its upper end engages, due to the lift of the spring 69, a motion transfer finger 70 mounted on the lower end of the bracket 40 which is part of the yoke assembly. The action of spring 69 is to cause the magnet 68 and its shaft 67 to follow the motion of the transfer finger 70 on the yoke assembly as the vehicle fender 13 moves or undulates and displaces the feeler rod 29.

The resilient character of the yoke arms 38 and 39 is such that the feeler rod 29 is urged in an upward direction to press on the vehicle fender 13 with sufficient range of movement to follow the upward displacement of the fender 13.

The mechanical components above-described operate to cause the shaft 47 (FIG. 5) of the potentiometer sensor 25 to follow upward movement of drive pin 43 and to cause the housing 49 containing the potentiometer coil 50A to follow downward movement of the pin 43. The brake finger holds the discs 51 and 52 of the housing 49 and shaft 47 in the positions of respective displacement. At the same time the transfer finger 70 on the yoke assembly causes the shaft 67 supporting the magnetic armature 68 of the sensor 26 to follow vehicle undulations at the velocity of such undulations.

In FIG. 9 there is depicted the circuit for the sensor 26. One side of the coil 66 is grounded and the opposite side is connected to a low pass filter 71 which damps the noise so the fundamental signal may pass to a sensitivity control 72 and then to an amplifier 73 where the signal is enlarged. A zero control means 74 is connected in the circuit to bias the hold circuit 75 and to adjust the zero position on a display meter 76, connected by lead 77, for the starting setting of operation. The hold circuit 75 is adapted to retain the peak voltage signals from the amplifier and feed them to the display meter 76 which will only display the highest velocity values of the signals from the sensor 26. This circuit includes the reset switch 64 which restores the same to zero starting conditions.

A suitable source of power P is connected by lead 93 to the various components.

In FIG. 10, the circuit for sensor 25 includes the same power source P connected by lead 94 to one side of the potentiometer coil in rotary housing 49. This coil because of the movable brush arm 50 provides two legs of the bridge circuit 78. The other two legs of the circuit are the fixed resistance 79 and the variable resistance 80, the latter of which is used to obtain a zero starting setting for the display meter 81. A sensitivity range resistance unit 82 is connected into the circuit for the brush arm 50. The output of the bridge circuit 78 is connected by leads 83 and 84 to the meter 81.

Meter 76 provides a display of the peak velocity of the undulating motion of the vehicle fender 13, while the meter 81 displays the maximum range of the motion. The needle on the meter 76 will swing in accordance with the rise and fall of the vehicle fender 13 to visually reveal the presence of soft and hard spots in the tire. If the swing is large to either side of the zero starting position it will indicate a particularly bad tire construction and one which can cause road thumping reactions. The meter 81, on the other hand, will only move in response to the extent that the drive fingers 53 and 54 are displaced by the drive pin 43 (FIG. 6) and that is usually accomplished in the first rotation of the tire 14 because as in the first rotation the drive pin 43 will have displaced the respective fingers 53 and 54 to the maximum extent of which the tire 14 is capable.

The potentiometer of sensor 25 is reset after completing the tire rotation by depressing the button 57. This clears the circuit of FIG. 9 and allows the meter 76 to return to zero for the next test.

As can be seen in FIG. 1, when the tire 14 is placed down on rollers 17 and 18 the springs 86 at wheels 87 yield and allow the frame 16 to rest on a pair of legs 88 (one being shown). At the same time, the springs 89 at casters 90 yield and allow the leg 91 to engage the floor. The frame 16 is now prevented from moving and motor 19 may be energized to rotate the tire 14 at slow speed of the order of 5 miles per hour. The meters 76 and 81 are suitably located on a remote panel board 92 and the leads 77, 83, and 84 (FIGS. 9 and 10) are contained in the wire bundle 33, along with the leads 93 and 94 from the power source P.

We claim:

1. Apparatus for displaying the supporting strength characteristics of a tire while rotating and supporting its share of the vehicle load conditions, said apparatus comprising means to follow the vehicle movement caused by tire strength variations around its circumference including a probe engaged on the vehicle; first sensor means operably connected to said vehicle movement follower means and responding to the maximum range of the vehicle movement, second sensor means operably connected to said vehicle movement follower means to continuously respond to such vehicle movement, and visual display means operably connected to said first and second sensor means to display the maximum range of vehicle movement and the vehicle movement caused by the presence of variations in the tire strength about its circumference.

2. The apparatus of claim 1 wherein said first sensor means includes a potentiometer operatively connected to said follower means.

3. The apparatus of claim 1 wherein said second sensor means includes a stator winding and a magnetic armature, said armature being connected operatively to said follower means.

4. The apparatus of claim 1 wherein said first sensor means includes a resistance and a contact brush relatively movable and each operatively connected to said follower means.

5. The apparatus of claim 4 wherein other means is operatively engaged with said resistance and contact brush to retain the same in relative moved positions.

6. Apparatus for displaying the strength characteristics of a tire while rotating and supporting its share of the vehicle load conditions, said apparatus comprising vehicle motion following means having a probe engaged adjacent one end with the vehicle; a stationary support engaged with said follower means said follower means being yieldable from an initial position to follow vehicle motion transmitted by said probe; vehicle motion sensing means carried by said stationary support including a movable resistance and a movable brush engaging said resistance; drive means operatively connected between said stationary support and each of said resistance and brush; yieldable means operatively biasing said resistance and brush to a predetermined starting position; holding means yieldably retaining said resistance and brush in relative moved positions in accordance with vehicle motion transmitted by said drive means; electrical meter display means; and circuit connections between said display means and said resistance and brush, including an adjustable resistance to bring said display means initially to a zero setting.

7. The apparatus of claim 6 wherein means is operatively connected to said holding means to release said resistance and brush for return to said starting position.

8. The apparatus of claim 6 wherein a second vehicle motion sensing means on said stationary support is operatively connected to said vehicle motion follower means to respond to the rate of vehicle motion during tire rotation, and second display means is connected to said second sensing means to display such vehicle motion.

9. The apparatus of claim 8 wherein said second sensing means includes a stator coil, a spring biased magnetic armature operatively connected to said follower means to move in response to vehicle motion and circuit means connected to said stator coil and to said second display means to continuously display vehicle motion response during tire rotation.

10. The apparatus of claim 9 wherein reset means is operatively connected to said holding means to release said resistance and brush for return to said starting position, and said spring biased magnetic armature responding to said reset means to urge said follower means to its said initial position.